Patented Oct. 2, 1951

2,569,524

UNITED STATES PATENT OFFICE 2,569,524

POLYMERIZATION OF TRIFLUOROCHLORO-ETHYLENE IN THE PRESENCE OF SILVER ION, BISULFITE ION AND PERSULFATE

Jefferson M. Hamilton, Jr., Wilmington, Del., assignor to E. I. du Pont de Nemours & Company, Wilmington, Del., a corporation of Delaware No Drawing. Application June 16, 1949,
Serial No. 99,593

20 Claims. (Cl. 260—87.5)

This invention relates to an improved process for polymerizing chlorotrifluoroethylene and certain mixtures thereof with tetrafluoroethylene and more particularly to carrying out such polymerization in the presence of an aqueous persulfate-bisulfite catalyst system to which has been added certain water-soluble silver salts.

It is known that many polymerizable ethylenic unsaturated organic compounds can be successfully polymerized in the presence of an aqueous catalyst system which comprises an aqueous solution of an oxygen-yielding catalyst, such as alkali persulfates, alkali perborates and hydrogen peroxide, and an oxidizable sulfoxy compound, such as the alkali bisulfites, with or without a buffer, such as the dialkali hydrogen phosphates and alkali borates. However, I have found that, when it is attempted to polymerize chlorotrifluoroethylene and mixtures thereof with tetrafluoroethylene containing up to 60% tetrafluoroethylene in the presence of such catalyst systems, the results are erratic, the polymerization rate and yields are low and the melt viscosity of the polymer is frequently low, whereas, polymer of high melt viscosity is required for many applications.

It has been proposed to polymerize certain ethylenic compounds, such as butadiene, styrene and acrylonitrile in the presence of such aqueous catalyst systems, employing metal salts, including silver nitrate, as activators therefor. In such prior investigations, it was found that different metals produced different effects with the different monomers. It was also found that the pH had to be controlled within narrow limits, the necessary pH varying with the monomer, the catalyst system and the metal employed. These various effects were particularly noted with silver nitrate. Further, in those cases where silver nitrate was effective, it could not be employed in concentrations above 0.5% as it actually retarded the polymerizations at such high concentrations.

It is an object of the present invention to provide a new and improved process for polymerizing chlorotrifluoroethylene and mixtures thereof with tetrafluoroethylene containing at least 40% chlorotrifluoroethylene in the presence of an aqueous persulfate-bisulfite catalyst system. Another object is to provide a process of this character whereby the polymerization rate is greatly increased and the yield of polymer is increased several fold, without deleteriously affecting the melt viscosity of the polymer. Further objects are to advance the art. Still other objects will appear hereinafter.

The above and other objects may be accomplished in accordance with my invention which comprises agitating monomeric chlorotrifluoroethylene and mixtures of monomeric chlorotrifluoroethylene and monomeric tetrafluoroethylene which contain at least substantially 40% chlorotrifluoroethylene at a temperature of from about 20° C. to about 60° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate, and in the absence of more than 10 parts per million of $O_2$, and subsequently separating the polymer from the reaction mixture. In a preferred embodiment of my invention, I also include in the aqueous catalyst system, about 2.5% to about 5% of an inorganic buffer of the character of an inorganic dialkali hydrogen phosphate and an inorganic alkali borate.

I have found that, by carrying out the polymerization in such manner, the rate of polymerization is very greatly increased and the yield of polymer is increased from about 5% to about 25% or more and, in some cases, to 100%. At the same time, the quality of the polymer is not deleteriously affected, as shown by the melt viscosity thereof. In other words, while the presence of the silver salt greatly increases the rate of polymerization and the yield, the quality of the polymer obtained is substantially equal to that obtained under the same conditions in the absence of the silver salt. Moreover, polymer of desired high melt viscosity is more consistently produced. While the polymerization rate in the prior catalyst systems could be accelerated by raising the temperature, the melt viscosity would be deleteriously affected, polymer of high melt viscosity being obtained only at slow polymerization rates and the melt viscosity of the product decreasing as the polymerization rate was increased.

Melt viscosity is the viscosity of the polymer under certain temperature conditions and is primarily dependent upon the molecular weight and thermal stability of the polymer, melt viscosity increasing primarily with increase in the molecular weight. Melt viscosity is measured by extrusion rates. In the present case, the extrusion rates were measured in a batch extruder having an 0.052 inch extrusion hole and an 0.375 inch plunger. The apparatus was constructed of 18—8 steel, and had a 12 pound plunger, giving a pressure of approximately 110 pounds per square inch absolute. A standard operating temperature of 295° C. on the thermocouple, corresponding to an actual inside temperature of 310° C., was employed. In operation, a 1 g. pellet of polymer was placed in the apparatus and allowed to warm for 2 minutes with the plunger in place. The weight was then placed on the plunger, and the amount of polymer extruded during the next minute recorded as the extrusion rate of the sample. Polymer of high melt viscosity will preferably have an extrusion rate of less than one inch per minute or ca. 100 mg.

This invention is concerned specifically with the polymerization of chlorotrifluoroethylene and mixtures of chlorotrifluoroethylene with tetrafluoroethylene, which mixtures contain at least substantially 40% by weight of chlorotrifluoroethylene and not more than substantially 60% by weight of tetrafluoroethylene. Preferably, the mixtures consist of about 95% to about 40% of chlorotrifluoroethylene and about 5% to about 60% of tetrafluoroethylene. In the absence of a silver salt, chlorotrifluoroethylene polymerizes at a very slow rate and gives small yields on the order of about 2% to about 5%. In the presence of silver salt, the polymerization rate is greatly increased and the yield of polymer is increased to about 25% or more, and, in some cases, to 100%. The addition of tetrafluoroethylene to the chlorotrifluoroethylene, to provide mixtures containing about 5% to about 60% tetrafluoroethylene, still further increases the rate of polymerization to 2 to 4 times that of chlorotrifluoroethylene alone, so that the yield of polymer in a given period of time, such as 4 hours, will be 2 to 4 times that obtained with chlorotrifluoroethylene alone. The copolymers, obtained from such mixtures, appear to be compositionally homogeneous and their composition corresponds substantially to the composition of the mixtures from which they are obtained. Their physical properties are generally comparable to those of the polymer obtained from chlorotrifluoroethylene alone, and, in addition, they are generally more stable to heat and are usually moldable over a wider range of temperatures, particularly when prepared from mixtures containing from about 5% to about 10% tetrafluoroethylene.

The persulfates, employed in the catalyst systems, will be those usually employed in systems of this character for the polymerization of ethylenically unsaturated compounds; that is, the inorganic alkali persulfates, such as ammonium persulfate, potassium persulfate and sodium persulfate. The concentration of persulfate in the aqueous catalyst system will preferably be in the range of about 0.5% to about 1%.

The bisulfites, employed in the catalyst system of my invention, will also be those ordinarily employed in systems of this character used for the polymerization of ethylenically unsaturated compounds; that is, the inorganic alkali bisulfites, such as ammonium bisulfite, sodium bisulfite and potassium bisulfite. Since inorganic alkali sulfites hydrolyze to bisulfites in aqueous solutions, the bisulfite may be obtained by employing an inorganic alkali sulfite in preparing the catalyst system; that is, by adding an inorganic alkali sulfite to the water or the solution of persulfate. The concentration of bisulfite in the aqueous catalyst system will preferably be in the range of about 0.1% to about 0.2%. The bisulfite is essential as, in its absence, the results are erratic.

The silver salts, which may be employed in the aqueous catalyst systems in accordance with my invention, are the inorganic silver salts which have a solubility in water at least equal to that of silver phosphate $(Ag_3PO_4)$. Representative silver salts are:

Silver nitrate
Silver sulfate
Silver chlorate
Silver perchlorate
Silver sulfite
Silver thiosulfate
Silver persulfate
Silver perborate
Silver bisulfite
Silver hydrogen phosphate
Silver phosphate
Silver tetraborate
Silver bromate
Silver fluoride
Silver permanganate Of these, it will generally be preferred to employ those which are cheapest and most readily available. Preferably, I employ silver nitrate.

The silver salt will be added to the aqueous catalyst system in a proportion to provide from about 0.01% to about 1% by weight of silver. The rate of polymerization and yield will generally increase with increase in the concentration of silver in the catalyst system. However, increase in the concentration of silver increases the cost of preparing the polymer. Furthermore, increase in the concentration of silver tends to increase the contamination of the polymer with the silver which is some times objectionable. Preferably, I employ an amount of silver salt to provide a concentration of about 0.01% to about 0.5% by weight of silver in the catalyst system, as such concentrations of silver provide a satisfactory reaction rate and high yields of polymer of desired quality with only trace contamination of the polymer with silver.

During the polymerization, the pH of the catalyst system tends to decrease. However, I have found that the polymerization of chlorotrifluoroethylene and mixtures thereof with tetrafluoroethylene in accordance with my invention, may be successfully conducted with the pH of the catalyst system ranging from about 2 to about 9. The rate of polymerization appears to be higher at low pH, but generally yields polymer of lower melt viscosity. Therefore, it is generally preferred to add a buffer to the aqueous catalyst system to retard the rate of decrease of the pH and, preferably, to maintain the pH in the range of from about 5 to about 7. The buffers, which may be employed for this purpose, are those which are commonly employed in aqueous persulfate-bisulfite catalyst systems, and particularly those of the character of the inorganic dialkali hydrogen phosphates and the inorganic alkali borates, such as the inorganic alkali tetraborates. The concentration of buffer in the catalyst system may range up to about 5% by weight. Preferably, the concentration of buffer will be from about 2.5% to about 5% so as to maintain the pH of the system at about 5 to about 7.

Ordinarily, the polymerization will be carried out at temperatures of about 20° C. to 60° C. and, preferably, at temperatures of about 20° C. to about 40° C. At substantially lower temperatures, the polymerization rate will usually be undesirably slow. At temperatures above 60° C., the polymerization will take place at a more rapid rate, but the polymer will have an undesirably low melt viscosity.

Preferably, the polymerization will be carried out with the monomeric chlorotrifluoroethylene and mixture of monomeric chlorotrifluoroethylene and monomeric tetrafluoroethylene in the liquid phase, although the polymerization can be carried out with the monomers in the vapor phase, but usually with decrease in the rate of polymerization and in the yield of polymer. The polymerization is carried out in a closed vessel under a pressure of at least 60 pounds per square inch gauge. In the liquid phase polymerization, I prefer to employ autogenous pressures, which range from about 65 pounds per square inch gauge at 20° C. to about 125 pounds at 40° C. and about 175 pounds at 60° C. Higher pressures may be employed, if desired, the maximum presssure depending upon the strength of the vessel employed. Pressures up to about 1000 atmospheres may be practicable. The vessels may be constructed of stainless steel of other corrosion resisting metal or lined with silver or glass.

The ratio of monomer to aqueous catalyst phase may be varied as desired. For practical purposes, I ordinarily employ about one part of monomer for each 1 to 10 parts of aqueous catalyst solution and, preferably, to each 1.5 to 6 parts of aqueous catalyst solution. The weight of polymer produced per liter of aqueous catalyst phase employed is fairly constant for the particular catalyst solution and the particular monomer or mixture or monomers and is not materially changed by variation in the ratio of monomer to aqueous solution.

Molecular oxygen, herein designated as $O_2$, has a retarding effect on the polymerizations of the present invention and, when present in material amounts, produces erratic results. Accordingly, $O_2$ is eliminated from the system as far as is practicable and, preferably, to less than 10 parts per million as determined by the Winkler gravi-metric method. For this reason, the water employed, preferably distilled water, will generally be deoxygenated by boiling it under a blanket of nitrogen or other inert medium or by bubbling an inert gas through it. The other ingredients of the aqueous catalyst system are normally sufficiently free of $O_2$ and, preferably, are added to the deoxygenated water under a blanket of nitrogen or other inert gas. Also, the monomer is normally sufficiently free of $O_2$ and is added to the aqueous catalyst system under a blanket of nitrogen or other inert gas. By carrying out the polymerization in the absence of more than 10 parts per million of $O_2$, uniformly satisfactory results are obtained.

After the polymerization is completed, the polymer is separated from the reaction mixture by opening the reaction vessel and recovering the excess monomer which distills off and then filtering off the polymer and washing with water, dilute alkali or dilute acid, as desired.

In order to more clearly illustrate my invention, preferred modes of carrying the same into effect and advantageous results to be obtained thereby, the following examples are given:

EXAMPLE I

A 400 cc. silver-lined bomb was swept with oxygen-free $N_2$ and, under this $N_2$ blanket, there was added a catalyst solution, to which had been added varying amounts of silver nitrate, as follows:

| | Grams |
|---|---|
| Water (distilled, boiled $O_2$-free) | 150.0 |
| $K_2S_2O_8$ or $(NH_4)_2S_2O_8$ | 1.0 |
| $NaHSO_3$ | 0.2 |
| $Na_2HPO_4.7H_2O$ | 3.0–6.0 |

The bomb was closed and evacuated. The monomer charge (either 50 or 100 g.) was then distilled into the bomb and the bomb sealed. The bomb was agitated vigorously at 40° C. for 8 hours and allowed to stand at about 25° C. for 8 additional hours. The results are shown in the following Table I:

*Table I*

| Persulfate | $C_2F_3Cl$ (g.) | $AgNO_3$ (g.) | Polymer (g.) | Extrusion Rate |
|---|---|---|---|---|
| $K_2S_2O_8$ | 100 | 0 | 3.2 | Inch ¼ |
| $K_2S_2O_8$ | 100 | 0.025 | 22.0 | ¼ |
| $(NH_4)_2S_2O_8$ | 50 | 0 | 3.0 | ca. ½ |
| $(NH_4)_2S_2O_8$ | 50 | 0.047 | 26.5 | ca. ½ |
| $(NH_4)_2S_2O_8$ | 50 | 0.50 | 42.0 | 0 |

EXAMPLE II

A mixture of 90 g. of chlorotrifluoroethylene and 10 g. of tetrafluoroethylene was distilled into a 300 cc. silver-lined pressure vessel containing a catalyst solution, composed of 100 cc. deoxygenated distilled water, 1.0 g. ammonium persulfate, 0.2 g. sodium bisulfite, 3.0 g. disodium hydrogen phosphate heptahydrate and 0.2 g. silver nitrate, and heated at 40° C. for 6 hours, the procedure otherwise conforming with that of Example I. There was thereby obtained 66 g. of a homogeneous copolymer of chlorotrifluoroethylene and tetrafluoroethylene.

When this example was repeated without the silver nitrate, only 10 g. of copolymer were obtained.

When a mixture of 40 g. of chlorotrifluoroethylene and 60 g. of tetrafluoroethylene was treated by the method of this example, employing the silver nitrate in the catalyst solution, a quantitative conversion to copolymer was obtained in 4 hours at 40° C.

EXAMPLE III

Employing the procedure of Example I, 50 g. of chlorotrifluoroethylene were treated with a catalyst solution composed of 75 g. deoxygenated water, 0.5 g. $K_2S_2O_8$, 0.2 g. $Na_2SO_3$, 5.0 g. $Na_2B_4O_7.10H_2O$ and 0.013 g. $AgNO_3$ whereby there was obtained 18 g. (36%) of polymer having an extrusion rate of about 0.5 inch (50 mg.). The catalyst solution had an initial pH of about 9 which did not change significantly during the run.

EXAMPLE IV

When 15 g. of chlorotrifluoroethylene were treated by the method of Example I employing a catalyst solution composed of 150 g. deoxygenated distilled water, 1.0 g. $K_2S_2O_8$, 0.2 g. $NaHSO_3$, 5.0 g. disodium hydrogen phosphate heptahydrate and 0.02 g. silver nitrate, there was obtained an 87% conversion of monomer to polymer.

EXAMPLE V

An autoclave, containing 1500 cc. deoxygenated water, 10 g. $(NH_4)_2S_2O_8$, 2 g. $(NH_4)_2SO_3$ and 0.25 g. $AgNO_3$, was pressured to 70 pounds per square inch with chlorotrifluoroethylene at 30° C. for 16 hours. A quantitative yield of polymer was obtained which had an extrusion rate of about 1.5 inches.

EXAMPLE VI

To a 300 cc. silver-lined pressure vessel, there was added, under nitrogen, 100 cc. deoxygenated distilled water (copper-free and iron-free), 1.0 g. ammonium persulfate, 0.2 g. sodium bisulfite, 1.57 g. silver nitrate (1% silver), and 3.0 g. disodium hydrogen phosphate heptahydrate. The reaction vessel was closed, immersed in a dry ice-acetone bath to freeze the aqueous solution, and evacuated. One hundred g. of chlorotrifluoroethylene were then distilled into the vessel, which was subsequently heated for six hours at 40° C. with vigorous agitation. The final pH of the reaction mixture was 2.15. Sixty-two g. of high molecular weight polymer of chlorotrifluoroethylene were obtained.

EXAMPLE VII

Following the procedure of Example VI, 100 g. chlorotrifluoroethylene were heated for 8 hours at 40° C. with a catalyst solution composed of 100 g. deoxygenated distilled water, 1.0 g. $K_2S_2O_8$, 0.2 g. $NaHSO_3$ and 0.2 g. $AgNO_3$. The reaction mixture had a final pH of 2.4. There was obtained 95 g. of polymer.

EXAMPLE VIII

Mixtures of 90 g. chlorotrifluoroethylene and 10 g. of tetrafluoroethylene were treated as in Example VI with catalyst solutions composed of 100 cc. deoxygenated distilled water, 1 g. alkali persulfate, 0.2 g. sodium bisulfite, varying amounts of $AgNO_3$ and varying amounts of $Na_2HPO_4 \cdot 7H_2O$, as a buffer, as shown in the following Table II:

*Table II*

| Buffer, gms. | $AgNO_3$, gms. | hrs./° C. | Final pH | gms. Polymer |
|---|---|---|---|---|
| 1 | 0.5 | 2/40 | 2.00 | 52 |
| 3 | 0.2 | 4/40 | 7.00 | 37 |
| none | 0.2 | 4/60 | 2.85 | 94 |
| 3 | none | 4/40 | 6.40 | 2.5 |

EXAMPLE IX

To a 300 cc. stainless steel pressure vessel, there was added, under nitrogen, 150 cc. of deoxygenated water (copper- and iron-free), 7.5 cc. of 3% hydrogen peroxide, 0.01 g. of ferric ammonium sulfate hexahydrate, and 1 g. of disodium hydrogen phosphate heptahydrate. The reaction vessel was closed, immersed in a dry ice-acetone bath to freeze the aqueous solution, and evacuated. Fifty (50) g. of purified chlorotrifluoroethylene were then distilled into the reactor, which was subsequently heated for 8 hours at 40° C. with vigorous agitation. From this run, 7 g. of polymer were obtained.

Using a 300 cc. silver-lined bomb under the conditions of the preceding paragraph and 0.2 g. of silver nitrate, instead of the 0.01 g. of ferric ammonium sulfate hexahydrate, with 3 cc. of 3% hydrogen peroxide, 1.0 g. of disodium hydrogen phosphate heptahydrate and 150 cc. of deoxygenated water, no polymer was obtained from 50 g. of chlorotrifluoroethylene.

Example 9 is included for purposes of comparison solely, to show that the silver salts are ineffective, in fact deleterious, in other catalyst systems, such as aqueous hydrogen peroxide systems. In addition, it should be noted that the effect of the silver salts is specific in my invention and that other metals, such as iron, copper, nickel, cobalt, zinc, lead, mercury, vanadium, titanium, chromium and zirconium, are not effective, but are, in fact, inoperative in this process. For example, when the silver salt in my process was replaced by each of the following metal salts, the polymerization rate and yield were decreased to about or below the rates and yields obtained in the absence of metal salts and, in some cases, no polymer was obtained:

- Ferrous ammonium sulfate
- Copper sulfate
- Cobalt nitrate
- Nickel nitrate
- Lead nitrate
- Mercuric nitrate
- Zirconium oxychloride
- Sodium dichromate
- Zinc chloride
- Ammonium vanadate
- Titanium hydroxide, $Ti(OH)_4$ It will be understood that the preceding examples have been given for illustrative purposes solely and that my invention is not limited to the specific embodiments disclosed therein, but I intend to cover my invention broadly as in the appended claims. It will be readily apparent to those skilled in the art that many variations and modifications can be made in the ingredients and proportions thereof in the aqueous catalyst system and in the other conditions of carrying out the process within the broad scope of my invention as hereinbefore described.

It will be apparent that, by my invention, it is possible to greatly increase the rate of polymerization of chlorotrifluoroethylene and certain mixtures thereof with tetrafluoroethylene to obtain greatly increased yields of polymer without deleterious effect on the quality and properties of the polymer. My invention is particularly important commercially because it makes possible the preparation of these valuable polymers in high yields and in a simple and economical manner. Therefore, it will be apparent that my invention constitutes a very valuable advance and contribution to the art.

I claim:

1. The process for making polymers which comprises agitating a member of the group consisting of monomeric chlorotrifluoroethylene and mixtures of monomeric chlorotrifluoroethylene and monomeric tetrafluoroethylene containing at least 40% chlorotrifluoroethylene at a temperature of from about 20° C. to 60° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate and in the absence of more than 10 parts per million of $O_2$, and separating the polymer from the reaction mixture.

2. The process for making polymers which comprises agitating a member of the group consisting of monomeric chlorotrifluoroethylene and mixtures of monomeric chlorotrifluoroethylene and monomeric tetrafluoroethylene containing at least 40% chlorotrifluoroethylene at a temperature of from about 20° C. to 60° C. in a closed vessel under a pressure of from about 65 to about 175 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate and in the absence of more than 10 parts per million of $O_2$, and separating the polymer from the reaction mixture.

3. The process for making polymers which comprises agitating a member of the group consisting of monomeric chlorotrifluoroethylene and mixtures of monomeric chlorotrifluoroethylene and monomeric tetrafluoroethylene containing at least 40% chlorotrifluoroethylene at a temperature of from about 20° C. to 60° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate and in the absence of more than 10 parts per million of $O_2$, and separating the polymer from the reaction mixture.

4. The process for making polymers which comprises agitating a member of the group consisting of monomeric chlorotrifluoroethylene and mixtures of monomeric chlorotrifluoroethylene and monomeric tetrafluoroethylene containing at least 40% chlorotrifluoroethylene at a temperature of from about 20° C. to 60° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 0.5% of silver added as an inorganic silver salt having a solubility in water at least equal to that of silver phosphate and in the absence of more than 10 parts per million of $O_2$, and separating the polymer from the reaction mixture.

5. The process for making polymers which comprises agitating a member of the group consisting of monomeric chlorotrifluoroethylene and mixtures of monomeric chlorotrifluoroethylene and monomeric tetrafluoroethylene containing at least 40% chlorotrifluoroethylene at a temperature of from about 20° C. to 60° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as silver nitrate and in the absence of more than 10 parts per million of $O_2$, and separating the polymer from the reaction mixture.

6. The process for making polymers which comprises agitating monomeric chlorotrifluoroethylene at a temperature of from about 20° C. to about 40° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate and in the absence of more than 10 parts per million of $O_2$, and separating the polymer from the reaction mixture.

7. The process for making polymers which comprises agitating monomeric chlorotrifluoroethylene at a temperature of from about 20° C. to about 40° C. in a closed vessel under a pressure of from about 65 to about 125 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate and in the absence of more than 10 parts per million of $O_2$, and seperating the polymer from the reaction mixture.

8. The process for making polymers which comprises agitating monomeric chlorotrifluoroethylene at a temperature of from about 20° C. to about 40° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate and in the absence of more than 10 parts per million of $O_2$, and seperating the polymer from the reaction mixture.

9. The process for making polymers which comprises agitating monomeric chlorotrifluoroethylene at a temperature of from about 20° C. to about 40° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 0.5% of silver added as an inorganic silver salt having a solubility in water at least equal to that of silver phosphate and in the absence of more than 10 parts per million of $O_2$, and separating the polymer from the reaction mixture.

10. The process for making polymers which comprises agitating monomeric chlorotrifluoroethylene at a temperature of from about 20° C. to 60° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as silver nitrate and in the absence of more than 10 parts per million of $O_2$, and seperating the polymer from the reaction mixture.

11. The process for making polymers which comprises agitating monomeric chlorotrifluoroethylene at a temperature of from about 20° C. to about 40° C. in a closed vessel under a pressure of from about 65 to about 125 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as silver nitrate and in the absence of more than 10 parts per million of $O_2$, and separating the polymer from the reaction mixture.

12. The process for making polymers which comprises agitating monomeric chlorotrifluoroethylene at a temperature of from about 20° C. to about 40° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as silver nitrate and in the absence of more than 10 parts per million of $O_2$, and separating the polymer from the reaction mixture.

13. The process for making polymers which comprises agitating monomeric chlorotrifluoroethylene at a temperature of from about 20° C. to about 40° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 0.5% of silver added as silver nitrate and in the absence of more than 10 parts per million of $O_2$, and separating the polymer from the reaction mixture.

14. The process for making polymers which comprises agitating a mixture of monomeric chlorotrifluoroethylene and monomeric tetrafluoroethylene containing at least 40% chlorotrifluoroethylene at a temperature of from about 20° C. to about 40° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as an inorganic silver salt having a solubility in water at least equal to that of silver phosphate and in the absence of more than 10 parts per million of $O_2$, and separating the polymer from the reaction mixture.

15. The process for making polymers which comprises agitating a mixture of monomeric chlorotrifluoroethylene and monomeric tetrafluoroethylene containing at least 40% chlorotrifluoroethylene at a temperature of from about 20° C. to about 40° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 1% of silver added as silver nitrate and in the absence of more than 10 parts per million of $O_2$, and separating the polymer from the reaction mixture.

16. The process for making polymers which comprises agitating a mixture of monomeric chlorotrifluoroethylene and monomeric tetrafluoroethylene containing at least 40% chlorotrifluoroethylene at a temperature of from about 20° C. to about 40° C. in a closed vessel in the liquid phase under autogenous pressures in the presence of an aqueous catalyst system composed essentially of water, about 0.5% to about 1% of an inorganic alkali persulfate, about 0.1% to about 0.2% of an inorganic alkali bisulfite and about 0.01% to about 0.5% of silver added as silver nitrate and in the absence of more than 10 parts per million of $O_2$, and separating the polymer from the reaction mixture.

17. The process for making polymers which comprises agitating a member of the group consisting of monomeric chlorotrifluoroethylene and mixtures of monomeric chlorotrifluoroethylene and monomeric tetrafluoroethylene containing at least 40% chlorotrifluoroethylene at a temperature of from about 20° C. to 60° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite, about 2.5% to about 5% of an inorganic buffer of the class consisting of inorganic dialkali hydrogen phosphates and inorganic alkali borates and about 0.01% to about 1% of silver added as an inorganic silver salt having a solubility in water at least equal to that of silver phosphate and in the absence of more than 10 parts per million of $O_2$, and separating the polymer from the reaction mixture.

18. The process for making polymers which comprises agitating monomeric chlorotrifluoroethylene at a temperature of from about 20° C. to about 40° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite, about 2.5% to about 5% of an inorganic buffer of the class consisting of inorganic dialkali hydrogen phosphates and inorganic alkali borates and about 0.01% to about 1% of silver added as an inorganic silver salt having a solubility in water at least equal to that of silver phosphate and in the absence of more than 10 parts per million of $O_2$, and separating the polymer from the reaction mixture.

19. The process for making polymers which comprises agitating monomeric chlorotrifluoroethylene at a temperature of from about 20° C. to about 40° C. in a closed vessel in the liquid phase under autogenous pressures in the presence of an aqueous catalyst system composed essentially of water, about 0.5% to about 1% of an inorganic persulfate, about 0.1% to about 0.2% of an inorganic bisulfite, about 2.5% to about 5% of an inorganic buffer of the class consisting of inorganic dialkali hydrogen phosphates and inorganic alkali borates and about 0.01% to about 1% of silver added as silver nitrate and in the absence of more than 10 parts per million of $O_2$, and separating the polymer from the reaction mixture.

20. The process for making polymers which comprises agitating a mixture of monomeric chlorotrifluoroethylene and monomeric tetrafluoroethylene containg at least 40% chlorotrifluoroethylene at a temperature of from about 20° C. to about 40° C. in a closed vessel under a pressure of at least 60 pounds per square inch in the presence of an aqueous catalyst system composed essentially of water, about 0.5% to about 1% of an inorganic alkali persulfate, about 0.1% to about 0.2% of an inorganic alkali bisulfite, about 2.5% to about 5% of an inorganic buffer of the class consisting of inorganic dialkali hydrogen phosphates and inorganic alkali borates and about 0.01% to about 1% of silver added as an inorganic silver salt having a solubility in water at least equal to that of silver phosphate and in the absence of more than 10 parts per million of $O_2$, and separating the polymer from the reaction mixture.

JEFFERSON M. HAMILTON, JR.

REFERENCES CITED

The following references are of record in the file of this patent:

UNITED STATES PATENTS

| Number | Name | Date |
|---|---|---|
| 2,230,654 | Plunkett | Feb. 4, 1941 |
| 2,473,548 | Smith | June 21, 1949 |

FOREIGN PATENTS

| Number | Country | Date |
|---|---|---|
| 572,265 | Great Britain | Oct. 1, 1945 |